(12) United States Patent
Spawn et al.

(10) Patent No.: US 7,029,729 B2
(45) Date of Patent: Apr. 18, 2006

(54) CHOLESTERIC LIQUID CRYSTAL ADDITIVES

(75) Inventors: Terence D. Spawn, West Lakeland Township, MN (US); Marc D. Radcliffe, Newport, MN (US); Richard J. Pokorny, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/373,213

(22) Filed: Feb. 24, 2003

(65) Prior Publication Data

US 2004/0164275 A1 Aug. 26, 2004

(51) Int. Cl.
C09K 19/52 (2006.01)
C09K 19/54 (2006.01)
C09K 19/20 (2006.01)
C09K 19/38 (2006.01)
G02F 1/1335 (2006.01)

(52) U.S. Cl. ............. 428/1.1; 252/299.01; 252/299.5; 252/299.64; 252/299.65; 252/299.67; 349/115

(58) Field of Classification Search ........... 252/299.01, 252/299.5, 299.2, 299.64, 299.65, 299.67; 428/1.1; 349/115
See application file for complete search history.

(56) References Cited

U.S. PATENT DOCUMENTS

| | | | |
|---|---|---|---|
| 4,293,435 A | 10/1981 | Portugall et al. | |
| 4,412,059 A | 10/1983 | Krigbaum et al. | |
| 4,974,941 A | 12/1990 | Gibbons et al. | |
| 5,032,009 A | 7/1991 | Gibbons et al. | |
| 5,332,522 A | 7/1994 | Chen et al. | |
| 5,389,698 A | 2/1995 | Chigrinov et al. | |
| 5,442,025 A * | 8/1995 | Spes et al. ............. | 528/15 |
| 5,581,905 A | 12/1996 | Huelsman et al. | |
| 5,602,661 A | 2/1997 | Schadt et al. | |
| 5,691,789 A | 11/1997 | Mustafa et al. | |
| 5,694,701 A | 12/1997 | Huelsman et al. | |
| 5,709,817 A | 1/1998 | Siemensmeyer et al. | |
| 5,744,057 A | 4/1998 | Meyer et al. | |
| 5,759,449 A | 6/1998 | Shiro et al. | |
| 5,780,629 A | 7/1998 | Etzbach et al. | |
| 5,834,112 A | 11/1998 | Muraoka et al. | |
| 5,838,407 A | 11/1998 | Chigrinov et al. | |
| 5,847,068 A | 12/1998 | Maxein et al. | |
| 5,886,242 A | 3/1999 | Etzbach et al. | |
| 5,958,293 A | 9/1999 | Gibbons et al. | |
| 5,958,305 A | 9/1999 | Shiro et al. | |
| 5,969,055 A | 10/1999 | Nishikawa et al. | |
| 5,989,461 A | 11/1999 | Coates et al. | |
| 5,994,212 A | 11/1999 | Arakawa et al. | |
| 6,001,277 A | 12/1999 | Ichimura et al. | |
| 6,060,042 A * | 5/2000 | Schuhmacher et al. ....... | 424/60 |
| 6,071,438 A | 6/2000 | Eckhard et al. | |
| 6,106,743 A * | 8/2000 | Fan ........................ | 252/582 |
| 6,134,808 A | 10/2000 | Yapel et al. | |
| 6,153,722 A | 11/2000 | Schoenfeld et al. | |
| 6,159,654 A | 12/2000 | Machida et al. | |
| 6,181,395 B1 | 1/2001 | Li et al. | |
| 6,309,561 B1 | 10/2001 | Hasegawa et al. | |
| 6,312,769 B1 | 11/2001 | Hiraoka et al. | |
| 6,316,170 B1 | 11/2001 | Kawamonzen et al. | |
| 6,395,354 B1 | 5/2002 | Sahouani et al. | |
| 6,473,143 B1 | 10/2002 | Li et al. | |
| 6,573,963 B1 * | 6/2003 | Ouderkirk et al. .......... | 349/117 |
| 6,620,342 B1 | 9/2003 | Burchill et al. | |
| 6,805,920 B1 * | 10/2004 | Nakano et al. .............. | 428/1.1 |
| 6,876,427 B1 * | 4/2005 | Bowley et al. ............. | 349/185 |
| 2002/0006479 A1 | 1/2002 | Sekine et al. | |
| 2002/0113937 A1 | 8/2002 | Ouderkirk et al. | |
| 2002/0159019 A1 | 10/2002 | Pokorny et al. | |
| 2002/0180912 A1 | 12/2002 | Hsieh et al. | |
| 2003/0063245 A1 | 4/2003 | Bowley et al. | |
| 2003/0072893 A1 | 4/2003 | Nakano et al. | |

FOREIGN PATENT DOCUMENTS

| | | |
|---|---|---|
| EP | 0 834 754 | 3/1997 |
| EP | 1 072 649 A1 | 1/2001 |
| GB | 2 357 291 A | 6/2001 |
| JP | 08-166603 | 6/1996 |
| JP | H 9-133810 | 5/1997 |
| JP | H 9-304770 | 11/1997 |

(Continued)

OTHER PUBLICATIONS

"Cholesteric Structure-I Optical Properties", J.L. Fergason, *Molecular Crystals*, Gordon and Breach Science Publishers, 1966, vol. 1, pp. 293-307.

(Continued)

*Primary Examiner*—Shean C. Wu
(74) *Attorney, Agent, or Firm*—Anna A. Kobilansky (57) ABSTRACT

The invention provides a cholesteric liquid crystal composition that includes at least one cholesteric liquid crystal precursor, and at least one non-liquid crystalline additive that is a non-liquid crystalline compound of formula I

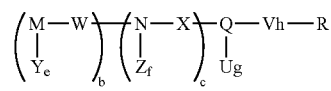

The invention also provides cholesteric liquid crystal films and optical bodies formed from cholesteric liquid crystal compositions of the invention. The invention further provides an optical display that includes a display medium, and a reflective polarizer including a cholesteric liquid crystal composition in accordance with the invention.

25 Claims, 1 Drawing Sheet

FOREIGN PATENT DOCUMENTS

| | | |
|---|---|---|
| JP | H 10-54909 | 2/1998 |
| JP | H 10-142407 | 5/1998 |
| JP | 2001-213919 A | 8/2001 |
| JP | 2001-316668 A | 11/2001 |
| JP | 2001-318225 A | 11/2001 |
| JP | 2001-354733 A | 12/2001 |
| JP | 2001-354734 A | 12/2001 |
| WO | WO 97/35219 | 2/1997 |

OTHER PUBLICATIONS

"Cholesteric Structure-II Optical Properties", J.L. Fergason, N.N. Goldberg and R.J. Nadalin, *Molecular Crystals*, Gordon and Breach Science Publishers, 1966, vol. 1, pp. 309-323.

"A Broadband Circularly Polarized Film (CPF)", J.-S. Luh et al. *IDW*, pp. 529-532 (2002).

* cited by examiner

CHOLESTERIC LIQUID CRYSTAL ADDITIVES

FIELD OF THE INVENTION

The invention generally relates to cholesteric liquid crystal compositions for forming cholesteric liquid crystal films and optical bodies such as reflective polarizers, and particularly relates to additives for inclusion in cholesteric liquid crystal compositions.

BACKGROUND OF THE INVENTION

Optical devices, such as polarizers and mirrors, are useful in a variety of applications including liquid crystal displays (LCD's). Liquid crystal displays fall broadly into two categories: backlit (e.g., transmissive) displays, where light is provided from behind the display panel, and frontlit (e.g., reflective) displays, where light is provided from the front of the display (e.g., ambient light). These two display modes can be combined to form transflective displays that can be backlit, for example, under dim light conditions or read under bright ambient light.

Conventional backlit LCDs typically use absorbing polarizers and can have less than 10% light transmission. Conventional reflective LCDs are also based on absorbing polarizers and typically have less than 25% reflectivity. The low transmission or reflectance of these displays reduces display brightness and can require high power consumption.

Reflective polarizers have been developed for use in these displays as well as other applications. Reflective polarizers preferentially reflect light having one polarization and transmit light of the opposite or orthogonal polarization. The reflected light has the ability to be recycled, making it possible to have a higher percentage of the light converted to polarized light and consequently a higher transmission of light. It is preferred that reflective polarizers transmit and reflect light without absorbing relatively large amounts of the light. Preferably, the reflective polarizer has no more than 10% absorption for the transmission polarization over the desired range of wavelengths. Most LCD's operate over a broad range of wavelengths and, as a consequence, the reflective polarizer must typically operate over that broad wavelength range, as well.

The invention provides compositions and methods of making optical bodies for use in such applications.

SUMMARY OF THE INVENTION

One embodiment of the invention provides a cholesteric liquid crystal composition that includes at least one cholesteric liquid crystal precursor, and at least one non-liquid crystalline additive of formula I (I)

where M, N, and Q are each independently:

b and c are each independently zero or 1;
W, X, and V are each non-directionally and independently a covalent bond, —C(=O)—O—, —C(=O)—S—, —C(=O)—Se—, —C(=O)—Te—, —(CH$_2$)$_k$— where k is 1 to 8, —(CH=CH)—, —(C≡C)—, —CH=N—, —CH$_2$—O—, —C(=O)—, —O—, —O—C(=O)—O—, or a combination thereof;
Y, Z, and U are each independently —H, —Cl, —F, —Br, —I, —OH, —O(CH$_2$)$_j$CH$_3$ where j is 0 to 8, —CH$_3$, —CF$_3$, —OCF$_3$, —CN, —NO$_2$, aryl, arylalkoxy, carboxylic acid, thioether, or an amide;
e, f, and g are each independently zero, 1, 2, 3, or 4;
h is 1, 2, or 3; and R is —H, —OH, —CN, $C_1$–$C_8$ alkyl, $C_1$–$C_8$ alkoxy, an aryl group, an arylalkoxy group, a carboxylic acid group, a halogen, a thioether, or an amide.

Another embodiment of the invention provides cholesteric liquid crystal films formed from a cholesteric liquid crystal composition of the invention. Optical bodies that include a reflective polarizer including a cholesteric liquid crystal formed from a cholesteric liquid crystal composition of the invention are also provided.

The above summary of the invention is not intended to describe each disclosed embodiment or every implementation of the invention. The Figures and the detailed description which follow more particularly exemplify these embodiments.

BRIEF DESCRIPTION OF THE DRAWINGS

The invention may be more fully understood in consideration of the following detailed description of various embodiments of the invention in connection with the accompanying drawings in which.

While the invention is amenable to various modifications and alternative forms, specifics thereof have been shown by way of example in the drawings and will be described in detail. It should be understood, however, that the intention is not to limit the invention to the particular embodiments described herein. On the contrary, the intention is to cover all modifications, equivalents, and alternatives falling within the spirit and scope of the invention.

DETAILED DESCRIPTION OF THE PREFERRED EMBODIMENT

Generally, a cholesteric liquid crystal composition in accordance with the invention includes at least one cholesteric liquid crystal material and at least one non-liquid crystalline additive. A cholesteric liquid crystal composition can also contain at least one solvent, and may contain compounds that function as initiators, terminators, curing agents, crosslinkers, antiozonants, antioxidants, plasticizers, stabilizers, and ultraviolet, infrared, or visible light-absorbing dyes and pigments. Cholesteric liquid crystal compositions of the invention can be used to form cholesteric liquid crystal layers.

The cholesteric liquid crystal material generally includes chiral molecules or moieties, or a mixture of chiral and achiral molecules and can be monomers, polymers or oligomers. The cholesteric liquid crystal material can include one or more cholesteric liquid crystal compounds (including cholesteric liquid crystal polymers), one or more cholesteric liquid crystal precursors (which can be used to form cholesteric liquid crystal compounds), or combinations thereof. Cholesteric liquid crystal compounds generally include at least one molecular unit that is chiral in nature (i.e., does not possess a plane of symmetry) and at least one molecular unit that is mesogenic in nature (i.e, exhibits a liquid crystal phase). Cholesteric liquid crystal compounds are also referred to as chiral nematic liquid crystal compounds. Cholesteric liquid crystal compounds can form a cholesteric liquid crystal phase in which the molecular and optical director (i.e., the unit vector in the direction of average local molecular alignment) of the liquid crystal rotates in a helical fashion along the dimension (the helical axis) perpendicular to the director.

The pitch of the cholesteric liquid crystal layer is the distance (in a direction perpendicular to the director) that it takes for the director or mesogen to rotate through 360°. This distance is generally 250 to 600 nm or more. The pitch of a cholesteric liquid crystal layer can typically be altered by mixing or otherwise combining (e.g., by copolymerization) in various proportions, at least one chiral compound (e.g., a cholesteric liquid crystal compound) with another typically nematic liquid crystal compound. In such a case, the pitch depends on the relative ratios, by molarity or weight, of the chiral compound in the cholesteric liquid crystal composition. The pitch is generally selected to be on the order of the wavelength of light of interest. The helical twist of the director results in a spatially periodic variation in the dielectric tensor, which in turn gives rise to the wavelength selective reflection of light. For example, the pitch can be selected such that the selective reflection occurs in the visible, ultraviolet, or infrared wavelengths of light or combinations thereof.

Cholesteric liquid crystal compounds and precursors, including cholesteric liquid crystal polymers, are generally known and any cholesteric liquid crystal compound or precursor known to those of skill in the art can be used in compositions of the invention. Examples of suitable cholesteric liquid crystal compounds and precursors are described in U.S. Pat. Nos. 4,293,435, 5,332,522, 5,886,242, 5,847,068, 5,780,629, and 5,744,057, all of which are incorporated herein by reference. However, other cholesteric liquid crystal compounds and precursors not disclosed therein can also be utilized in compositions of the invention.

Generally, a cholesteric liquid crystal compound or precursor is selected, at least in part, based on the particular application or optical body that it is ultimately to be used in. Examples of characteristics that can be considered in the choice of cholesteric liquid crystal compounds or precursors include but are not limited to: refractive indices, pitch, processability, clarity, color, low absorption in the wavelength region of interest, compatibility with other components (e.g., a nematic liquid crystal compound), ease of manufacture, availability of the cholesteric liquid crystal compound, precursor, or monomers to form a cholesteric liquid crystal polymer, rheology, method and requirements of curing, ease of solvent removal, physical and chemical properties (e.g., flexibility, tensile strength, solvent resistance, scratch resistance, and phase transition temperature), and ease of purification.

Cholesteric liquid crystal compounds that are cholesteric liquid crystal polymers are typically formed using chiral molecules or a mixture of chiral and achiral molecules (including monomers) that include a mesogenic group. Mesogenic groups are generally a rigid rodlike or disclike molecule or portion of a molecule that are components of liquid crystals. Examples of mesogenic groups include, but are not limited to, para-substituted cyclic groups, such as para-substituted benzene rings. These mesogenic groups are optionally bonded to a polymer backbone through a spacer. The spacer can contain functional groups having, for example, benzene, pyridine, pyrimidine, alkyne, ester, alkylene, alkane, ether, thioether, thioester, and amide functionalities.

Suitable cholesteric liquid crystal polymers include, but are not limited to, polymers having a chiral or achiral polyester, polycarbonate, polyamide, polyacrylate, polymethacrylate, polysiloxane, or polyesterimide backbone that include mesogenic groups optionally separated by rigid or flexible comonomers. Examples of other suitable cholesteric liquid crystal polymers have a polymer backbone (for example, a polyacrylate, polymethacrylate, polysiloxane, polyolefin, or polymalonate backbone) with chiral and achiral mesogenic side-chain groups. The side-chain groups can be optionally separated from the backbone by a spacer, such as an alkylene or alkylene oxide spacer, to provide flexibility.

In one embodiment of the invention, a suitable cholesteric liquid crystal precursor in accordance with the invention includes compounds of formula II (II)

where a is 1, 2, or 3;
where M, N, and Q are each independently:

W, X, and V are each non-directionally and independently a covalent bond, $-C(=O)-O-$, $-C(=O)-S-$, $-C(=O)-Se-$, $-C(=O)-Te-$, $-(CH_2)_k-$ where k is 1 to 8, $-(CH=CH)-$, $-(C\equiv C)-$, $-CH=N-$, $-CH_2-O-$, $-C(=O)-$, $-O-$, $-O-C(=O)-O-$, or a combination thereof;

Y, Z, and U are each independently $-H$, $-Cl$, $-F$, $-Br$, $-I$, $-OH$, $-O(CH_2)_jCH_3$ where j is 0 to 8, $-CH_3$, $-CF_3$, $-OCF_3$, $-CN$, $-NO_2$, aryl, arylalkoxy, carboxylic acid, thioether, or an amide;

e, f, and g are each independently zero, 1, 2, 3, or 4; and
h is 1, 2, or 3; and P is an acrylate, methacrylate, acrylamide, isocyanate, epoxy, or silane.

In some embodiments, P is an acrylate or methacrylate.

An example of a compound of formula II that may be utilized as a cholesteric liquid crystal precursor in a cholesteric liquid crystal composition of the invention includes, but is not limited to, cyanobiphenyl benzoate ethyl acrylate.

Cholesteric liquid crystal compositions of the invention also comprise at least one non-liquid crystalline additive (i.e., an additive that is not a liquid crystal) of formula I (I)

where M, N, and Q are each independently:

-continued b and c are each independently zero or 1;

W, X, and V are each non-directionally and independently a covalent bond, —C(=O)—O—, —C(=O)—S—, —C(=O)—Se—, —C(=O)—Te—, —(CH$_2$)$_k$— where k is 1 to 8, —(CH=CH)—, —(C—C)—, —CH=N—, —CH$_2$—O—, —C(=O)—, —O—, —O—C(=O)—O—, or a combination thereof;

Y, Z, and U are each independently —H, —Cl, —F, —Br, —I, —OH, —O(CH$_2$)$_j$CH$_3$ where j is 0 to 8, —CH$_3$, —CF$_3$, —OCF$_3$, —CN, —NO$_2$, aryl, arylalkoxy, carboxylic acid, thioether, or an amide;

e, f, and g are each independently zero, 1, 2, 3, or 4;

h is 1, 2, or 3; and

R is —H —OH, —CN, C$_1$-C$_8$ alkyl, C$_1$-C$_8$ alkoxy, an aryl group, an arylalkoxy group, a carboxylic acid group, a halogen, a thioether, or an amide.

As used herein, a compound that is non-liquid crystalline is one that when melted forms an isotropic phase instead of a nematic or cholesteric liquid crystalline phase.

Examples of compounds of formula I that may be utilized as a non-liquid crystalline additive in cholesteric liquid crystal compositions of the invention include, but are not limited to, 4'-hydroxy-1,1'-biphenyl-4-carbonitrile, 4'-cyano-1,1'-biphenyl-4-yl 4-methoxybenzoate, 4'-cyano-1,1'-biphenyl-4-yl 4-ethoxybenzoate, 4'-cyano-1,1'-biphenyl-4-yl 4-propoxybenzoate, 4'-cyano-1,1'-biphenyl-4-yl 4-butoxybenzoate, 4'-cyano-1,1'-biphenyl-4-yl 4-ethyleneoxide, 4'-cyano-1,1'-biphenyl-4-yl 4-methylesterbenzoate, and 4'-cyano-1,1'-biphenyl-4-yl 4-heptyloxybenzoate.

One subset of particularly suitable moieties for use independently as one or more of M, N, or Q independently in either the cholesteric liquid crystal precursor of formula II or the non-liquid crystalline additive of formula I (or both the precursor and additive) is:

Another subset of particularly suitable moieties for use independently as one or more of M, N, and Q in either the cholesteric liquid crystal precursor of formula II or the non-liquid crystalline additive of formula I (or both the precursor and additive) is:

In some embodiments, N and Q are selected to be different moieties. In some embodiments, M, N, and Q are all phenylene. In some embodiments, b is preferably zero.

A subset of particularly suitable moieties for use independently as one or more of W, X, and V in either the cholesteric liquid crystal precursor of formula II or the non-liquid crystalline additive of formula I (or both the precursor and additive) is a covalent bond, —C(=O)—O—, —C(=O)—S—, —(CH$_2$)$_k$— where k is 1 to 8, —(CH=CH)—, —(C—C)—, —CH=N—, —C(=O)—, —O—, —O—C(=O)—O—, or a combination thereof. Another subset of particularly suitable moieties for use independently as one or more of W, X, and V in either the cholesteric liquid crystal precursor of formula II or the non-liquid crystalline additive of formula I (or both the precursor and additive) is a covalent bond, —C(=O)—O—, —$(CH_2)_k$— where k is 1 to 8, —(C≡C)—, —CH═N—, —C(═O)—, —O—C(═O)—O—, or a combination thereof. Yet another subset of particularly suitable moieties for use as V in either the cholesteric liquid crystal precursor of formula II or the non-liquid crystalline additive of formula I (or both the precursor and additive) is a covalent bond, —C(═O)—O—, —O—, or a combination thereof.

A subset of particularly suitable moieties for use independently as one or more of Y, Z, and U in either the cholesteric liquid crystal precursor of formula II or the non-liquid crystalline additive of formula I (or both the precursor and additive) is a —H, —Cl, —F, —Br, —I, —OH, —O$(CH_2)_j CH_3$ where j is 0 to 8, —$CH_3$, —$CF_3$, —$OCF_3$, —CN, or —$NO_2$. Another subset of particularly suitable moieties for use independently as one or more of Y, Z, and U in either the cholesteric liquid crystal precursor of formula II or the non-liquid crystalline additive of formula I (or both the precursor and additive) is a —OH, —O$(CH_2)_j CH_3$ where j is 0 to 8, or —$CH_3$. In some embodiments, Y can also be C1–C8 alkyl.

In many embodiments, one or more of e, f, and g is independently zero, 1, or 2.

Particularly suitable moieties for R are —OH, —CN, $C_1$–$C_8$ alkoxy, and halogen (particularly —F). Preferably, R is not the same as Z.

Particularly suitable moieties for P are acrylate, methacrylate, and silane.

One embodiment of the invention includes a cholesteric liquid crystal composition that includes at least one cholesteric liquid crystal precursor of formula II (II)

where M, N, P, Q, U, V, W, X, Y, Z, a, e, f, g, and h are as defined above, and at least one non-liquid crystalline additive of formula I (I)

where M, N, Q, R, U, V, W, X, Y, Z, b, c, e, f, g, and h are as defined above and where at least Q is the same in both formulas I and II.

In another embodiment, Q, U, V, g, and h are the same in both formula I and II and b and c are 0 for at least formula I. In yet another embodiment at least Q, U, V, X, N, Z, f, g, and h are the same in both formulas I and II and b is 0 and c is 1 for at least formula I. In a further embodiment, at least Q, U, V, X, N, Z, W, M, Y, e, f, g, and h are the same in both formulas I and II and b and c are 1 for at least formula II.

Examples of compounds that can be utilized as cholesteric liquid crystal precursors of formula II and non-liquid crystalline additives of formula I in one of these embodiments include, but are not limited to, cyanobiphenyl benzoate ethyl acrylate as a cholesteric liquid crystal precursor of formula II, and 4'-hydroxy-1,1'-biphenyl-4-carbonitrile, 4'-cyano-1,1'-biphenyl-4-yl 4-methoxybenzoate, 4'-cyano-1,1'-biphenyl-4-yl 4-ethoxybenzoate, 4'-cyano-1,1'-biphenyl-4-yl 4-propoxybenzoate, 4'-cyano-1,1'-biphenyl 4-yl-4-yl 4-butoxybenzoate, and 4'-cyano-1,1'-biphenyl-4-yl 4-heptyloxybenzoate as non-liquid crystalline additives of formula I.

It should be understood by those of skill in the art having read this specification that cholesteric liquid crystal compositions of the invention can include more than one non-liquid crystalline additive of formula I, and can also include more than one cholesteric liquid crystal precursor of formula II.

In one embodiment of the invention, cholesteric liquid crystal compositions generally have from about 1 to 35% of one or more non-liquid crystalline additives of formula I by weight of the total solids content of the composition. In another embodiment, the cholesteric liquid crystal composition has from about 10 to 20% of one or more non-liquid crystalline additives of formula I by weight of the total solids content of the composition. In a further embodiment, the cholesteric liquid crystal composition has about 15% of one or more non-liquid crystalline additives of formula I by weight of the total solids content of the composition.

In some embodiments, the ratio, by weight, of the non-liquid crystalline additive to the liquid crystal precursor is in the range of 1:99 to 1:3. In some embodiments, the ratio, by weight, of the non-liquid crystalline additive to the liquid crystal precursor is in the range of 1:10 to 1:5.

The addition of non-liquid crystalline additives of formula I to cholesteric liquid crystal compositions of the invention is thought to aid in the alignment of the cholesteric liquid crystal precursors during the formation of a liquid crystal layer. Because non-liquid crystalline additives of formula I may serve to impart this characteristic to cholesteric liquid crystal compositions of the invention, they are often referred to as "compatible". One indication of compatibility is that the at least one cholesteric liquid crystal layer is more uniformly aligned when the additive is used. For example, compatibility can be observed by measuring a transmission of a dried film of the cholesteric liquid crystal composition with the additive as compared to a similar composition without the non-liquid crystalline additive. In another embodiment, the measured transmission is higher than that of a composition without the non-liquid crystalline additive.

The spectrum of the coated film is then measured by using a Lambda 900 spectrophotometer (Perkin Elmer, Santa Clara, Calif.) with a Glan-Thomas polarizer and a ¼ wave film in the optical path. The ¼ wave axis is maintained at 45° to the polarizer axis. First the uncoated polyester film is placed after the ¼ wave plate in the light path and used as a blank and the instrument is zeroed. The sample is then placed in the light path after the ¼ wave plate and facing the ¼ wave pate. The spectra is recorded from 400 nm to 500 nm. The range of 400 nm to 500 nm is used since this covers the blue portion of the visible spectrum. Incompatible coatings can produce haze which scatters light. Typically, more scattering occurs in the blue portion of the spectrum. The spectra is averaged every 10 nm in order to get a % pass transmission for the sample.

The extinction of the cholesteric liquid crystal film that is formed from a cholesteric liquid crystal composition of the invention can be an indication of some of the properties of the cholesteric liquid crystal film that may ultimately be obtained from a cholesteric liquid crystal composition of the invention. Extinction can be measured in a manner similar to transmission but with the polarizer rotated 90 degrees position used in the transmission measurement. In one embodiment, the extinction of a cholesteric liquid crystal film formed from a cholesteric liquid crystal composition of the invention is less than that of a cholesteric liquid crystal film formed from a cholesteric liquid crystal composition without the non-liquid crystalline additive. In another embodiment, the extinction is not greater than about 15%. In another embodiment, the extinction is at least 5% less than the composition without the additive.

One example of a method for carrying out an extinction test method includes the following procedure. The additive, which is to be determined compatible or not, is mixed with the cholesteric liquid crystal precursor in a suitable solvent. An exemplary composition for this mixture includes 17% cholesteric liquid crystal precursor, 3% additive, and 80% solvent. The solution, containing the compound and the cholesteric liquid crystal precursor, is coated on a clear plastic film with an alignment surface. For example, a polyethylene terephthalate oriented (PET) film which offers a natural liquid crystal alignment surface, and is commercially available from 3M (SCOTCHPAK™ type 718386, St. Paul, Minn.) or DuPont (Wilmington, Del.). The coating is dried, then annealed at a temperature such that the cholesteric liquid crystal precursor is in its nematic phase and below the nematic to isotropic transition temperature of the liquid crystal polymer formed thereby. The solution should be coated in an amount to give a dried thickness of about 4 micrometers (μm).

Cholesteric liquid crystal compositions in accordance with the invention can also include a solvent. In some instances, one or more of the cholesteric liquid crystal precursors or other components of the cholesteric liquid crystal composition can act as a solvent. The one or more solvents, or other compounds that function as a solvent are generally substantially eliminated from the cholesteric liquid crystal composition during processing. They can be eliminated by, for example, drying the composition to evaporate the solvent or reacting a portion of the solvent (e.g., reacting a solvating liquid crystal monomer to form a liquid crystal polymer). Any solvents known to those of skill in the art as being able to solubilize the components of the composition can be used, specific examples include, but are not limited to, tetrahydrofuran, cyclohexanone, cyclopropanone, methyl ethyl ketone and 1,3-dioxolane. Combinations of solvents can also be utilized in compositions of the invention.

Cholesteric liquid crystal compositions in accordance with the invention can also include polymerization initiators that function to initiate polymerization or crosslinking of monomeric or other lower molecular weight compounds of the composition. Suitable polymerization initiators include compounds that can generate free radicals to initiate and propagate polymerization or crosslinking. Free radical initiators can be chosen based on a number of factors, including but not limited to, stability or half-life. Preferably, the free radical initiator does not generate any additional color in the cholesteric liquid crystal layer by absorption or otherwise.

Free radical initiators are typically either thermal free radical initiators or photoinitiators. Thermal free radical initiators, which generate free radicals upon thermal decomposition, include, for example, peroxides, persulfates, or azonitrile compounds. Photoinitiators can be activated by electromagnetic radiation or particle irradiation. Examples of suitable photoinitiators include, but are not limited to, onium salt photoinitiators, organometallic photoinitiators, cationic metal salt photoinitiators, photodecomposable organosilanes, latent sulphonic acids, phosphine oxides, cyclohexyl phenyl ketones, amine substituted acetophenones, and benzophenones. Generally, ultraviolet (UV) irradiation is used to activate the photoinitiator, although other light sources or irradiation (e-beam) can be used. Photoinitiators can be chosen based on the absorption of particular wavelength of light.

Cholesteric liquid crystal compositions in accordance with the invention may also additionally contain compounds that function as dispersing agents, terminators, curing agents, crosslinkers, antiozonants, antioxidants, plasticizers, stabilizers, viscosity modifiers, such as thickeners and fillers, coalescing agents, which function to improve the intimacy of the contact between particles after deposition onto the substrate, and dyes and pigments for absorbing ultraviolet, infrared, or visible light.

Any method known to those of skill in the art for forming a cholesteric liquid crystal composition of the invention into a cholesteric liquid crystal layer can be utilized. Furthermore, improvements in and changes to existing methods of forming cholesteric liquid crystal layers can also be utilized to form cholesteric liquid crystal layers from cholesteric liquid crystal compositions of the invention. The methods discussed below offer examples of methods and techniques that may be utilized to form cholesteric liquid crystal layers in accordance with the invention, and are not meant to limit the invention in any way.

One method of forming a cholesteric liquid crystal layer includes applying a cholesteric liquid crystal composition to a surface of a substrate. The cholesteric liquid crystal composition can be applied to the surface in a number of ways, including, but not limited to coating and spraying. Alternatively, the surface of the substrate can be oriented prior to being coated with the cholesteric liquid crystal layer. The substrate can be oriented using, for example, drawing techniques, rubbing with a rayon or other cloth, or lyotropic alignment (U.S. Pat. No. 6,395,354). Photoalignment substrates are described in U.S. Pat. Nos. 4,974,941, 5,032,009, 5,389,698, 5,602,661, 5,838,407, and 5,958,293.

After coating, the cholesteric liquid crystal composition is converted into a liquid crystal layer. Generally, this process includes drying the composition and annealing the dried composition, alternatively, these processes can occur somewhat simultaneously. The formation of a cholesteric liquid crystal layer can be accomplished by a variety of techniques including evaporation of solvent that is present; crosslinking the cholesteric liquid crystal composition; annealing or curing (e.g., polymerizing) the cholesteric liquid crystal composition using, for example, heat, radiation (e.g., actinic radiation), light (e.g., ultraviolet, visible, or infrared light), an electron beam, or a combination of these or similar techniques.

One example of a process of forming a liquid crystal layer includes depositing the cholesteric liquid crystal composition on an oriented substrate. After deposition, the cholesteric liquid crystal composition is heated above the glass transition temperature of the composition to the liquid crystal phase. The composition is then cooled below the glass transition temperature and the composition remains in the liquid crystal phase.

Another process for forming a liquid crystal layer includes depositing the cholesteric liquid crystal composition on a substrate, and aligning the oligomeric liquid crystal by drying the composition to remove the solvent. Cholesteric liquid crystal compositions of the invention can be dried by any method known to those of skill in the art including those that restrict air flow. Examples of methods and/or apparatuses that restrict airflow can be found in U.S. Pat. Nos. 5,581,905; 5,694,701; and 6,134,808, all of which are incorporated herein by reference.

Cholesteric liquid crystal compositions can be formed into a layer that substantially reflects light having one polarization (e.g., left or right circularly polarized light) and substantially transmits light having the other polarization (e.g., right or left circularly polarized light) over a particular bandwidth of light wavelengths. This characterization describes the reflection or transmission of light directed at normal incidence to the director of the cholesteric liquid crystal material. Light that is directed at other angles will typically be elliptically polarized by the cholesteric liquid crystal material and the Bragg reflection peak is typically blue-shifted from its on-axis wavelength. Cholesteric liquid crystal materials are generally characterized with respect to normally incident light, as done below, however, it will be recognized that the response of these materials can be determined for non-normally incident light using known techniques.

The cholesteric liquid crystal layer can be used alone or in combination with other cholesteric liquid crystal layers or other types of layers or devices to form an optical body, such as, for example, a reflective polarizer. Cholesteric liquid crystal polarizers are used in one type of reflective polarizer. The pitch of a cholesteric liquid crystal polarizer is similar to the optical layer thickness of multilayer reflective polarizers. Pitch and optical layer thickness determine the center wavelength of the cholesteric liquid crystal polarizers and multilayer reflective polarizers, respectively. The rotating director of the cholesteric liquid crystal polarizer forms optical repeat units similar to the use of multiple layers having the same optical layer thickness in multilayer reflective polarizers.

The center wavelength, $\lambda_0$, and the spectral bandwidth, $\Delta\lambda$, of the light reflected by the cholesteric liquid crystal layer depend on the pitch, p, of the cholesteric liquid crystal. The center wavelength, $\lambda_0$, is approximated by:

$$\lambda_0 = 0.5(n_o + n_e)p$$

where $n_o$ and $n_e$ are the refractive indices of the cholesteric liquid crystal for light polarized parallel to the director of the liquid crystal ($n_e$) and for light polarized perpendicular to the director of the liquid crystal ($n_o$). The spectral bandwidth, $\Delta\lambda$, is approximated by:

$$\Delta\lambda = 2\lambda_0(n_e - n_o)/(n_e + n_o) = p(n_e - n_o).$$

Cholesteric liquid crystal polarizers can be formed by laminating or otherwise stacking two already-formed cholesteric liquid crystal layers, each disposed on an individual substrate, with different pitches (e.g., layers having different compositions, for example, different ratios by weight of chiral and nematic liquid crystal compounds or monomers). These two layers are heated to diffuse liquid crystal material between the layers. The diffusion of material between the two layers typically results in the pitch of the layers varying over a range between the individual pitches of the two layers. Other methods of forming cholesteric liquid crystal polarizers are described in, for example, U.S. patent applications Ser. Nos. 09/790,832; 09/791,157; and 09/957,724, all of which are incorporated herein by reference.

Figure 1:
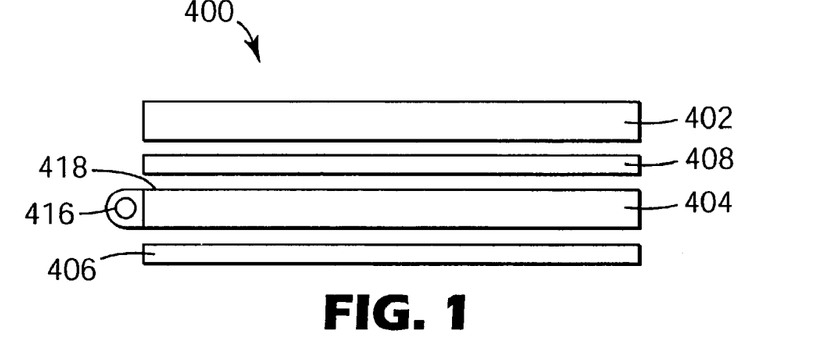
FIG. 1 is a schematic illustration of one embodiment of a liquid crystal display in accordance with the invention.

The cholesteric liquid crystal optical bodies can be used in a variety of optical displays and other applications, including transmissive (e.g., backlit), reflective, and transflective displays. For example, FIG. 1 illustrates a schematic cross-sectional view of one illustrative backlit display system 400 including a display medium 402, a backlight 404, a cholesteric liquid crystal reflective polarizer 408, as described above, and an optional reflector 406. The display system optionally includes a wave plate as part of the cholesteric liquid crystal reflective polarizer or as a separate component to convert the circularly polarized light from the liquid crystal reflective polarizer to linearly polarized light.

A viewer is located on the side of the display device 402 that is opposite from the backlight 404.

The display medium 402 displays information or images to the viewer by transmitting light that is emitted from the backlight 404. One example of a display medium 402 is a liquid crystal display (LCD) and polarizer that transmits only light of one polarization state.

The backlight 404 that supplies the light used to view the display system 400 includes, for example, a light source 416 and a light guide 418, although other backlighting systems can be used. Although the light guide 418 depicted in FIG. 1 has a generally rectangular cross-section, backlights can use light guides with any suitable shape. For example, the light guide 418 can be wedge-shaped, channeled, a pseudo-wedge guide, etc. The primary consideration is that the light guide 418 be capable of receiving light from the light source 416 and emitting that light. As a result, the light 418 can include back reflectors (e.g., optional reflector 406), extraction mechanisms and other components to achieve the desired functions.

The reflective polarizer 408 is an optical film that includes at least one cholesteric liquid crystal optical body, as described above. The reflective polarizer 408 is provided to substantially transmit light of one polarization state exiting the light guide 418 and substantially reflect light of a different polarization state exiting the light guide 418.

Figure 2:
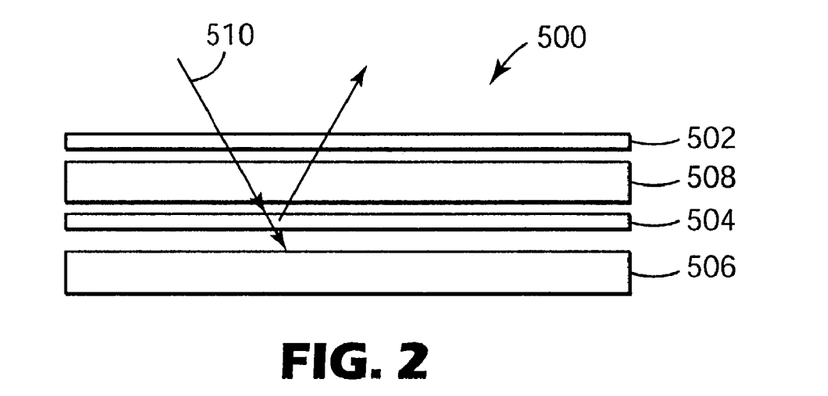
FIG. 2 is a schematic illustration of another embodiment of a liquid crystal display in accordance with the invention.

FIG. 2 is a schematic illustration of one type of reflective liquid crystal display 500. This reflective liquid crystal display 500 includes a display medium 508, a cholesteric liquid crystal reflective polarizing mirror 504, an absorptive backing 506, and an absorptive polarizer 502. The liquid crystal display 500 optionally includes a wave plate as part of the cholesteric liquid crystal reflective polarizer 504 or as a separate component to convert mixed polarization light from the liquid crystal device to an appropriately polarized light.

Liquid crystal display 500 functions first by the absorptive polarizer 502 polarizing light 510. The polarized light then travels through the display medium 508 where one of the light's circular polarization components reflects from the cholesteric liquid crystal reflective polarizing mirror 504 and passes back through the display medium 508 and absorptive polarizer 502. The other circular polarization component passes through the cholesteric liquid crystal reflective polarizer 504 and is absorbed by the backing 506. The reflective polarizer 504 of this reflective liquid crystal display 500 includes one cholesteric liquid crystal optical body, as described above. The specific choice of cholesteric liquid crystal optical body can depend on factors such as, for example, cost, size, thickness, materials, and wavelength range of interest.

Figure 3:
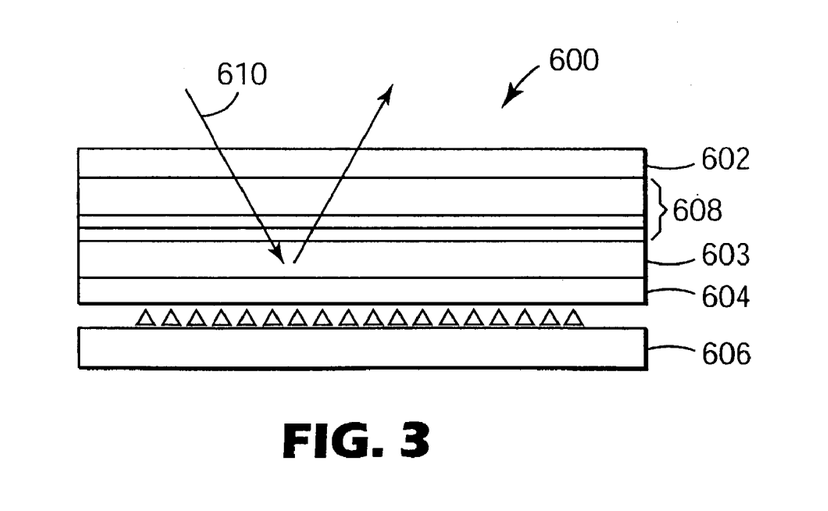
FIG. 3 is a schematic illustration of yet another embodiment of a liquid crystal display in accordance with the invention.

FIG. 3 is a schematic illustration of one type of transflective liquid crystal display 600. This transflective liquid crystal display 600 includes a phase retarding display medium 608, a partial mirror 603, a cholesteric liquid crystal reflective polarizing mirror 604, a backlight 606, and an absorptive polarizer 602. The display system optionally includes a wave plate as part of the cholesteric liquid crystal reflective polarizer 604 or as a separate component to convert mixed polarization light from the liquid crystal device to an appropriately polarized light. In the reflective mode, bright ambient light 610 is polarized by the absorptive polarizer 602, travels through the display medium 608, reflects off the partial mirror 603, and passes back through the display medium 608 and absorptive polarizer 602. In low ambient-light situations, the backlight 606 is activated and light is selectively passed through the cholesteric polarizer 604, matched to provide appropriately polarized light to the display. Light of the opposite handedness is back-reflected, recycled, and selectively passed through the cholesteric polarizer 604 to effectively increase backlight brightness. The reflective polarizer of this reflective liquid crystal display 600 includes one cholesteric liquid crystal optical body, as described above. The specific choice of cholesteric liquid crystal optical body can depend on factors such as, for example, cost, size, thickness, materials, and wavelength range of interest.

The cholesteric liquid crystal optical body can be used with a variety of other components and films that enhance or provide other properties to a liquid crystal display. Such components and films include, for example, brightness enhancement films, retardation plates including quarter-wave plates and films, multilayer or continuous/disperse phase reflective polarizers, metallized back reflectors, prismatic back reflectors, diffusely reflecting back reflectors, multilayer dielectric back reflectors, and holographic back reflectors.

WORKING EXAMPLES

All chemicals for the following examples were obtained from Aldrich, Inc. of Milwaukee, Wis. unless indicated otherwise.

Example 1

Synthesis of Various Non-liquid Crystalline Additives

4'-cyano-1,1'-biphenyl-4-yl 4-methoxybenzoate was prepared by first combining 40 g (0.26 moles) of 4-methoxybenzoic acid, 53.2 g (0.525 moles) triethylamine, and 400 ml of 1,2-dimethoxyethane in a round bottomed flask fitted with a mechanical stirrer and a thermometer, under an atmosphere of nitrogen. The solution was cooled to −30° C., at which point 30.1 g (0.263 moles) of methane sulfonyl cholride was added. Stirring was continued, and the temperature was maintained at −30° C. for about 1 hour. Next, 51.32 g (0.263 moles) of 4'-hydroxy-1,1'-biphenyl-4-carbonitrile and 3.2 g (0.026 moles) of 4-dimethylaminopyridene were added and the mixture was heated to 50° C. and maintained at that temperature with stirring for about 3 hours. The mixture was then cooled to room temperature and 1 liter of H$_2$O was added. A solid product precipitated, was collected by filtration, and was washed with water and air dried. The crude material was then recrystallized from a minimal amount of tetrahydrofuran to obtain the desired material.

Other exemplary additives were made using the same procedure by replacing the 4-methoxybenzoic acid with the chemical indicated in Table 1 below.

TABLE 1

| Exemplary Additive | Chemical |
|---|---|
| 4'-cyano-1,1'-biphenyl-4-yl 4-ethoxybenzoate | 4-ethoxybenzoic acid |
| 4'-cyano-1,1'-biphenyl-4-yl 4-propoxybenzoate | 4-propoxybenzoic acid |
| 4'-cyano-1,1'-biphenyl-4-yl 4-butoxybenzoate | 4-butoxybenzoic acid |
| 4'-cyano-1,1'-biphenyl-4-yl 4-heptyloxybenzoate | 4-heptoxybenzoic acid |

Example 2

Effect of Various Additives 4-(2-Acryloyloxy-ethoxy)-benzoic acid 4'-cyano-biphenyl-4-yl ester (also known as cyanobiphenyl benzoate ethyl acrylate) can be prepared as described in European Patent Application Publication No. 834754, incorporated herein by reference, and is a cholesteric liquid crystal monomer having the structure:

18.5 wt % cyano biphenyl benzoate ethyl acrylate, 1.18 wt % Paliocolor LC 756 (BASF, Charlotte, N.C.), 59.2 wt % tetrahydrofuran, 19.6 wt % cyclohexanone, 0.93 wt % carbon tetrabromide, and 0.59% Vazo 52 (Wilmington, Del.) were combined and heated at about 60° C. for about 14 hours.

After 14 hours, the various non-liquid crystalline additives were added to the initial solution. The additives were added in an amount 15% of the weight of the initial solids. The resulting solutions were mixed until clear, at a temperature of 60° C. The mixed solutions were then coated on to 100 micron thick PET film (Scotch Pak™, 3M). The coated film was baked at about 120° C. for about 12 minutes. The spectrum of each coated film was then measured by using a Lambda 900 spectrophotometer (Perkin Elmer, Santa Clara, Calif.) with a Glan-Thomas polarizer and Newport zero order achromatic ¼ wave film in the optical path. The polarizer was then oriented to give the minimum transmission (extinction) and the spectra was recorded. The minimum in the spectra was averaged over 120 nm of bandwidth and is given in Table 2 below.

TABLE 2

| Additive | Extinction (% Transmission) | Pass Transmission |
|---|---|---|
| control (no additive) | 17.1 | 99.3 |
| 4'-hydroxy-1,1'-biphenyl-4-carbonitrile | 11.0 | 99.1 |
| 4'-cyano-1,1'-biphenyl-4-yl 4-methoxybenzoate | 9.5 | 99.3 |
| 4'-cyano-1,1'-biphenyl-4-yl 4-ethoxybenzoate | 10.1 | 99.0 |
| 4'-cyano-1,1'-biphenyl-4-yl 4-propoxybenzoate | 8.1 | 99.1 |
| 4'-cyano-1,1'-biphenyl-4-yl 4-butoxybenzoate | 9.6 | 99.2 |
| 4'-cyano-1,1'-biphenyl-4-yl 4-heptyloxybenzoate | 29.1 | 98.2 |
| 4'-cyano-1,1'-biphenyl-4-yl benzoate | 10.6 | 99.2 |

As can be seen from Table 1, while all of the additives that were utilized were compatible with the liquid crystal polymer (they all had pass transmission of >90%) the cholesteric liquid crystal films formed thereby had varying results for extinction. They all produced cholesteric liquid crystal layers with a lower extinction, versus the composition without any additive (control), except for the composition with 4'-cyano-1,1'-biphenyl-4-yl 4-heptyloxybenzoate.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A cholesteric liquid crystal composition comprising:
a liquid crystalline polymer obtained from polymerization of a liquid crystal monomer of formula II; and
at least one non-liquid crystalline additive of formula I that comprises a substructure of the liquid crystal monomer of formula II;
wherein formula II is:

(II)

where M, N, and Q are each independently:

b and c are each independently zero or 1;
W, X, and V are each non-directionally and independently a covalent bond, —C(=O)—O—, —C(=O)—S—, —C(=O)—Se—, —C(=O)—Te—, —(CH$_2$)$_k$— where k is 1 to 8, —(CH=CH)—, —(C≡C)—, —CH=N—, —CH$_2$—O—, —C(=O)—, —O—, —O—C(=O)—O—, or a combination thereof;
Y, Z, and U are each independently —H, —Cl, —F, —Br, —I, —OH, —O(CH$_2$)$_j$CH$_3$ where j is 0 to 8, —CH$_3$, —CF$_3$, —OCF$_3$, —CN, —NO$_2$, aryl, arylalkoxy, carboxylic acid, thioether, or an amide;
e, and g are each independently zero, 1, 2, 3, or 4;
h is 1, 2, or 3; and
P is an acrylate, methacrylate, acrylamide, isocyanate, epoxy, silane or vinyl;
and wherein formula I is:

(I)

where M, N, and Q, W, X, and V, Y, Z, and U, b, c, e, f, and g, h, are as defined
for formula II and
R is —H, —OH, —CN, C$_1$–C$_8$ alkyl, C$_1$–C$_8$ alkoxy, an aryl group, an arylalkoxy group, a carboxylic acid group, a halogen, a thioether, or an amide.

2. The cholesteric liquid crystal composition of claim 1, wherein P is acrylate, methacrylate, silane or vinyl.

3. The cholesteric liquid crystal composition of claim 1, wherein P is acrylate or methacrylate.

4. The composition according to claim 1, wherein the cholesteric liquid crystal composition has a transmission that is greater than that of to cholesteric liquid crystal composition without the non-liquid crystalline additive.

5. A cholesteric liquid crystal film formed from the cholesteric liquid crystal composition according to claim 1, wherein the cholesteric liquid crystal film has an extinction transmission that is less than that of a film formed from the cholesteric liquid crystal composition without to non-liquid crystalline additive.

6. The composition according to claim 1, wherein the liquid crystalline polymer is cyanobiphenyl benzoate ethyl acrylate and to non-liquid crystalline additive is 4'-cyano-1,1'-biphenyl-4-yl 4-methoxybenzoate, 4'-cyano-1,1'-biphenyl-4-yl 4-ethoxybenzoate, 4'-cyano-1,1'-biphenyl-4-yl 4-propoxybenzoate, 4'-cyano-1,1'-biphenyl-4-yl 4-butoxybenzoate, or a combination thereof.

7. The composition according to claim 1, wherein an amount of the non-liquid crystalline additive is about 1 to 35% by weight of the total solids content of the composition.

8. The composition according to claim 1, wherein the amount of the non-liquid crystalline additive is about 10 to 20% by weight of the total solids content of the composition.

9. The cholesteric liquid crystal composition according to claim 1, further comprising a solvent.

10. The cholesteric liquid crystal composition according to claim 1, further comprising at least one compound that functions as an initiator, a terminator, a curing agent a crosslinker, an antiozonants, an antioxidant a plasticizer, a stabilizer, a light absorbing dye, or a pigment.

11. An optical body comprising a cholesteric liquid crystal layer formed from a cholesteric liquid crystal composition in accordance with claim 1.

12. An optical display comprising:
a display medium; and
an optical body comprising a cholesteric liquid crystal composition according to claim 1.

13. The optical display according to claim 12, wherein the optical body is a reflective polarizer.

14. A cholesteric liquid crystal composition comprising:
a liquid crystalline polymer obtained from polymerization of a liquid crystal monomer of formula II; and
at least one non-liquid crystalline additive of formula I that comprises a substructure of formula II;
wherein formula II is:

(II)

where M, N, and Q each independently contain either phenyl or napthalene or biphenyl aromatic rings,
b and c are each independently zero or 1;
W, X, and V are each non-directionally and independently a covalent bond, —C(=O)—O—, —C(=O)—S—, —C(=O)—Se—, —C(=O)—Te—, —(CH$_2$)$_k$— where k is 1 to 8, —(CH=CH)—, —(C≡C)—, —CH=N—, —CH$_2$—O—, —C(=O)—, —O—, —O—C(=O)—O—, or a combination thereof;
Y, Z, and U are each independently —H, —Cl, —F, —Br, —I, —OH, —O(CH$_2$)$_j$CH$_3$ where j is 0 to 8, —CH$_3$, —CF$_3$, —OCF$_3$, —CN, —NO$_2$, aryl, arylalkoxy, carboxylic acid, thioether, or an amide;
e, f, and g are each independently zero, 1, 2, 3, or 4;
h is 1, 2, or 3; and
P is an acrylate, methacrylate, acrylamide, isocyanate, epoxy, silane or vinyl;
and wherein formula I is:

(I)

where M, N, and Q, W, X, and V, Y, Z, and U, b, c, e, f, and g, h, are as defined for formula II and
R is —H, —OH, —CN, C$_1$–C$_8$ alkyl, C$_1$–C$_8$ alkoxy, an aryl group, an arylalkoxy group, a carboxylic acid group, a halogen, a thioether, or an amide.

15. The composition according to claim 14, wherein the cholesteric liquid crystal composition has a transmission that is greater than that of the cholesteric liquid crystal composition without the non-liquid crystalline additive.

16. A cholesteric liquid crystal film formed from the cholesteric liquid crystal composition according to claim 14, wherein the cholesteric liquid crystal film has an extinction transmission that is less than that of a film formed from the cholesteric liquid crystal composition without the non-liquid crystalline additive.

17. The composition according to claim 14, wherein the liquid crystalline polymer is cyanobiphenyl benzoate ethyl acrylate and the non-liquid crystalline additive is 4'-cyano-1,1'-biphenyl-4-yl 4-methoxybenzoate, 4'-cyano-1,1'-biphenyl-4-yl 4-ethoxybenzoate, 4'-cyano-1,1'-biphenyl-4-yl 4-propoxybenzoate, 4'-cyano-1,1'-biphenyl-4-yl 4-butoxybenzoate, or a combination thereof.

18. The composition according to claim 14, wherein an amount of the non-liquid crystalline additive is about 1 to 35% by weight of the total solids content of the composition.

19. The composition according to claim 14, wherein an amount of the non-liquid crystalline additive is about 10 to 20% by weight of the total solids content of the composition.

20. The cholesteric liquid crystal composition according to claim 14, further comprising a solvent.

21. The cholesteric liquid crystal composition according to claim 14, further comprising at least one compound that fractions as an initiator, a terminator, a curing agent, a crosslinker, an antiozonant, an antioxidant, a plasticizer, a stabilizer, a light absorbing dye, or a pigment.

22. An optical body comprising a cholesteric liquid crystal layer formed from a cholesteric liquid crystal composition in accordance with claim 14.

23. An optical display comprising:
a display medium; and
an optical body comprising a cholesteric liquid crystal composition according to claim 14.

24. The optical display according to claim 23, wherein the optical body is a reflective polarizer.

25. A method of making a cholesteric liquid crystal composition, comprising the steps of:
(a) selecting at least one cholesteric liquid crystal precursor characterized by formula II:

(II)

(b) selecting at least one non-liquid crystalline additive comprising a substructure of the at least one cholesteric liquid crystal precursor, said non-liquid crystalline additive characterized by formula I:

(I)

where M, N, and Q are each independently:

b and c are each independently zero or 1;

W, X, and V are each non-directionally and independently a covalent bond, —C(=O)—O—, —C(=O)—S—, —C(=O)—Se—, —C(=O)—Te—, —(CH$_2$)$_k$— where k is 1 to 8, —(CH=CH)—, —(C≡C)—, —CH=N—, —CH$_2$—O—, —C(=O)—, —O—, —O—C(=O)—O—, or a combination thereof;

Y, Z, and U are each independently —H, —Cl, —F, —Br, —I, —OH, —O(CH$_2$)$_j$CH$_3$ where j is 0 to 8, —CH$_3$, —CF$_3$, —OCF$_3$, —CN, —NO$_2$, aryl, arylalkoxy, carboxylic acid, thioether, or an amide;

e, f, and g are each independently zero, 1, 2, 3, or 4;

h is 1, 2, or 3;

R is —H, —OH, —CN, C$_1$–C$_8$ alkyl, C$_1$–C$_8$ alkoxy, an aryl group, an arylalkoxy group, a carboxylic acid group, a halogen, a thioether, or an amide; and P is an acrylate, methacrylate, acrylamide, isocyanate, epoxy, silane or vinyl;

(c) combining the at least one cholesteric liquid crystal precursor with the at least one non-liquid crystalline additive to produce a cholesteric liquid crystal composition;

(d) testing the cholesteric liquid crystal composition to determine its pass transmission and its extinction transmission; and (e) (i) selecting the cholesteric liquid crystal composition having a pass transmission that is greater than that of a film formed from the cholesteric liquid crystal composition without the non-liquid crystalline additive or an extinction transmission that is less than that of a film formed from the cholesteric liquid crystal composition without the non-liquid crystalline additive, or (ii) repeating steps (a) through (d) if the cholesteric liquid crystal composition has a pass transmission that is less than that of a film formed from the cholesteric liquid crystal composition without the non-liquid crystalline additive and an extinction transmission that is more than that of a film formed from the cholesteric liquid crystal composition without the non-liquid crystalline additive.

\* \* \* \* \*

UNITED STATES PATENT AND TRADEMARK OFFICE
CERTIFICATE OF CORRECTION

PATENT NO. : 7,029,729 B2
APPLICATION NO. : 10/373213
DATED : April 18, 2006
INVENTOR(S) : Terence D. Spawn It is certified that error appears in the above-identified patent and that said Letters Patent is hereby corrected as shown below:

Title Page,
Column 2 (U.S. Patent Documents), Line 7, After "6,316,170" delete "B1" and insert -- B2 --, therefor.
Column 2 (U.S. Patent Documents), Line 9, After "6,473,143" delete "B1" and insert -- B2 --, therefor.
Column 2 (Other Publications), Line 3, Delete "vol." and insert -- Vol. --, therefor.

Col. 2,
Column 2 (Other Publications), Line 3, Delete "vol." and insert -- Vol. --, therefor.
Line 59, Delete "(C=C)" and insert -- (C≡C) --, therefor.

Col. 3,
Line 39, Delete "EMBODIMENT" and insert -- EMBODIMENTS --, therefor.
Line 63, Delete "(i.e," and insert -- (i.e., --, therefor.

Col. 6,
Line 17 (approx.), Delete "(C-C)" and insert -- (C≡C) --, therefor.

Col. 7,
Line 38, Delete "(C-C)" and insert -- (C≡C) --, therefor.

Col. 8,
Line 61, Delete "(C-C)" and insert -- (C≡C) --, therefor.

Col. 9,
Line 67, After "biphenyl" delete "4-yl-4-yl" and insert -- -4-yl --, therefor.

Col. 13,
Line 53-54, Delete "patent applications" and insert -- Patent Applications --, therefor.

Col. 15,
Line 42 (approx.), Delete "cholride" and insert -- chloride --, therefor.

Col. 18,
Line 25 (approx.), In Claim 1, after "e," insert -- f, --.
Line 50 (approx.), In Claim 4, delete "to" and insert -- the --, therefor.
Line 56 (approx.), In Claim 5, delete "to" and insert -- the --, therefor.
Line 60, In Claim 6, delete "to" and insert -- the --, therefor.

UNITED STATES PATENT AND TRADEMARK OFFICE
CERTIFICATE OF CORRECTION

PATENT NO. : 7,029,729 B2
APPLICATION NO. : 10/373213
DATED : April 18, 2006
INVENTOR(S) : Terence D. Spawn It is certified that error appears in the above-identified patent and that said Letters Patent is hereby corrected as shown below:

Col. 19,
Line 8, In Claim 10, after "agent" insert -- , --.
Line 9, In Claim 10, delete "antiozonants," and insert -- antiozonant, --, therefor.
Line 9, In Claim 10, after "antioxidant" insert -- , --.

Col. 20,
Line 30 (approx.), In Claim 21, delete "fractions" and insert -- functions --, therefor.

Col. 22,
Line 12, In Claim 25, delete "(C=C)" and insert -- (C≡C) --, therefor.

Signed and Sealed this

Twentieth Day of February, 2007

JON W. DUDAS
*Director of the United States Patent and Trademark Office*